United States Patent
Gage et al.

[11] Patent Number: 5,828,630
[45] Date of Patent: Oct. 27, 1998

[54] DIFFRACTION-BASED DIRECT READ DURING WRITE USING MAGNETO-OPTIC RECORDING MEDIA

[75] Inventors: Edward C. Gage, Fairport; Clarke K. Eastman; Steven C. Dohmeier, both of Rochester; James A. Barnard, Scottsville, all of N.Y.

[73] Assignee: Eastman Kodak Company, Rochester, N.Y.

[21] Appl. No.: 852,975

[22] Filed: May 7, 1997

Related U.S. Application Data

[60] Provisional application No. 60/035,239, Jan. 9, 1992.
[51] Int. Cl.$^6$ ........................................... G11B 7/00
[52] U.S. Cl. .............................. 369/13; 369/116
[58] Field of Search ............................ 369/13, 112, 116, 369/110, 44.14, 44.25

[56] References Cited

U.S. PATENT DOCUMENTS

| | | | |
|---|---|---|---|
| 4,764,912 | 8/1988 | Ando et al. | 369/13 |
| 5,020,041 | 5/1991 | Nakao et al. | 369/13 |
| 5,099,470 | 3/1992 | Matsubayashi | 369/13 |
| 5,105,399 | 4/1992 | Shimonou | 369/13 |
| 5,282,188 | 1/1994 | Gage | 369/110 |
| 5,347,297 | 9/1994 | Gage | 346/108 |
| 5,537,383 | 7/1996 | Gage et al. | 369/116 |
| 5,561,655 | 10/1996 | Gage et al. | 369/110 |
| 5,586,101 | 12/1996 | Gage et al. | 369/13 |

Primary Examiner—Tan Dinh
Attorney, Agent, or Firm—Pamela R. Crocker

[57] ABSTRACT

A magneto-optic head for reading and writing information on a magneto-optic recording medium so that diffraction effects can be monitored during writing is disclosed. The magneto-optic head includes a source of laser light for projecting a laser light beam during writing and reading, a first partial polarizing beamsplitter disposed in the beam of light for causing one beam of light to be transmitted to the recording medium and for receiving reflected light and for projecting such light in a first direction, a second polarizing beamsplitter for receiving polarized light in the first direction from the first partial polarizing beamsplitter and projecting such polarized light in second and third directions, a first detector for receiving light in the second direction from the second polarizing beamsplitter and a second detector for receiving light in the second direction from the second polarizing beamsplitter, each detector including at least two photosensitive elements being split in the in-track direction so that in-track diffraction effects can be determined.

9 Claims, 6 Drawing Sheets

DIFFRACTION-BASED DIRECT READ DURING WRITE USING MAGNETO-OPTIC RECORDING MEDIA

This application claims benefit of USC. Provisional Ser. No. 60/035,239, filed Jan. 9, 1997.

CROSS REFERENCE TO RELATED APPLICATIONS

Reference is made to commonly-assigned U.S. patent application Ser. No. 08/834,571, filed on Apr. 7, 1997, entitled "Direct Read During Mark Formation for Laser Power Correcting," by Gage et al., the teachings of which are incorporated herein by reference.

FIELD OF THE INVENTION

The present invention relates to magneto-optical data recording, and more particularly, to correcting and monitoring data during writing or recording on magneto-optic media.

BACKGROUND OF THE INVENTION

The optical storage systems at present can generally be placed into one of two categories, with the categories being determined by the optical property used to identify different logical states on the storage medium. The first optical storage system can be referred to as a differential absorption system wherein differential absorption (or reflection) of a radiation beam impinges on the storage medium surface. In the differential absorption optical systems, each logical state is associated with changes in the intensity of a beam of radiation interacting with the storage medium. In the second category of optical storage systems, changes in the rotation of plane polarized beam of radiation are used to identify optical states. The present invention is directed to the second category of optical storage systems, and in particular, to a magneto-optic head used for reading and writing data.

Diffraction effects from the storage media of the differential absorption systems are the same for all polarization states. This non-polarization specific diffraction is typically associated with write-once media. In contrast, diffraction effects from magneto-optic storage media of the second category of optical storage systems are equal and opposite in sign for two polarization states, which are referred to in the art as eigen states of the media.

Referring to FIG. 1, the implementation of the read/write head in a magneto-optical information storage system is shown. The system relies on differential rotation of the planar polarization of optical radiation caused by the interaction of the optical radiation with the storage surface, is shown. This type of storage system relies on the Kerr effect wherein the rotation of a plane of polarization is different when a magnetic material has a magnetic orientation parallel to or a magnetic orientation anti-parallel to the direction of the radiation interacting with the magnetic material, i.e., the differential change in polarization of a reflected beam depends upon the orientation of the magnetization of the local domain with which the radiation interacts. As with the implementation for detecting a change in reflected light amplitude, the radiation from a light source 10 is collimated by a lens 11 and one plane of polarization is selected by passing the collimated beam through a partial polarizing beamsplitter 12. Because linearly polarized radiation can be considered to be comprised of two circularly polarized radiation components, the interaction with the magnetic layer forming a portion of storage medium 15 effects the two circularly polarized components differently. As a result, after interaction with the storage material, the reflected radiation is not linearly polarized parallel to the applied radiation, but an elliptical polarization of the reflected radiation results in a rotation of the reflected linear polarization due to the circular dichroism and the circular birefringence of the storage medium 15. The reflected radiation is recollimated by an objective lens 14. The recollimated beam is applied to the partial polarizing beamsplitter 12 and the components of the radiation beam orthogonal to the plane of polarization of the radiation impinging on the storage medium 15, i.e., the components induced by the interaction, are reflected by the partial polarizing beamsplitter 12. Some of the light with polarization parallel to the impinging radiation can also be reflected from the magneto-optic region. The radiation reflected by the partial polarizing beamsplitter 12 is transmitted through a quarter waveplate 16A and a half waveplate 16B to correct for ellipticity introduced into the radiation beam. A polarizing beamsplitter 17 divides the radiation reflected from the partial polarizing beamsplitter 12 into radiation components which have been rotated by the interaction with the storage material. Each detector 18 and 19 receives a component resulting from one orientation of the magnetic regions of the storage medium 15 interacting with the impinging radiation beam. A differential amplifier 20 is used to enhance the detectability of the small signals, the rotation due to the Kerr effect typically being less than 2 degrees relative to reflected radiation which had not been subjected to differential interaction of the circularly polarized components with the optical storage material and to cancel the large DC component of the two radiation components.

In the optical storage systems using a magneto-optical storage medium, a need has been felt for a technique of determining how to optimize the parameters of the system in order to achieve the most detectable signal. In the article by W. A. Challener and T. A. Rinehart, "Jones Matrix Analysis of Magnetooptical Media and Read-Back Systems," Appl. Opt. 26, 3974 (1987), part of the problem of a differential detection system was addressed. In that article, the substrate birefringence and the waveplate tolerances were studied. However, the DC offset in the differential signal was not considered and a range of "ideal" waveplates was found, each with a sensitivity to the optical path birefringence. Therefore, the need has remained for generally applicable technique for identifying the parameters which would permit optimization of the detection of the state of the region of the storage system to which radiation was being applied.

A method to monitor the mark formation process on optical recording media is described in commonly-assigned U.S. patent application Ser. No. 08/666,172, entitled "Phase Detected Direct Read During Write," filed Jun. 19, 1996, the disclosure of which is incorporated herein by reference. The method is based on in-track diffraction by a mark forming beneath a recording spot.

A data detection scheme using in-track diffraction by boundaries between previously recorded areas of different magnetization is described in "Edge Detection for Magneto-Optical Data Storage" by M. D. Levenson et al., Appl. Opt. 30, pp. 2332–252 (1991). Commonly assigned U.S. Pat. No. 5,561,655 entitled "Apparatus and Method for Differential Tracking in System Using Mark Edge Detection," the disclosure of which is incorporated herein by reference, adapts this technique to the cross-track direction in a scheme to keep a recording or read-back spot on-track. U.S. Pat. No. 5,561,655 describes a differential detection scheme in which light reflected by the disk is split, according to its polarization, into two separate optical paths. This is illustrated in the magneto-optic record/playback head of FIG. 2.

As shown in FIG. 2, a laser light source 30 projects a beam of laser light to a lens 32 which collimates the beam and projects the beam to a first partial polarizing beamsplitter 34. The first partial polarizing beamsplitter 34 directs the light through an objective lens 36 which focuses the light on a magneto-optic recording medium 38, shown as a disk. Light reflected from the disk 38 passes through the objective lens 36 and is directed to the first partial polarizing beamsplitter 34 where it is projected in a first direction. A second partial polarizing beamsplitter 40 receives the light in the first direction and passes some of it directly to detectors which are used for focus signal detection, which are well known in the art. The second partial polarizing beamsplitter 40 also directs the light to a waveplate 42 which conditions the polarization state of the light beam. After exiting the waveplate 42, the light beam is directed to a third polarizing beamsplitter 44. The third polarizing beamsplitter 44 completely polarizes the light. As shown in FIG. 2, there are two detectors 46 and 48 which receive light from the third polarizing beamsplitter 44. The detectors 46 and 48 are actually split, so that each detector has two photosensitive elements $A_1$, $B_1$, and $A_2$ and $B_2$, respectively. The detectors 46 and 48 are split in the cross-track direction. The signals generated by the detectors 46 and 48 are used to monitor the recorded data and cross-track diffraction effects during reading. A problem with this arrangement is that the in-track diffraction effects are ignored.

What makes the cross-track diffraction detection method of FIG. 2 different from "conventional" push-pull tracking detection is how signals from the two optical paths (each path having a different polarization state) are combined to form a tracking signal. For a "conventional" push-pull signal, the signals from the photosensitive elements $A_1$ and $A_2$ would be added together. Similarly, the signals from the photosensitive elements $B_1$ and $B_2$ would be added together. The resulting signals would then be subtracted to form the basis of the tracking signal. A "conventional" push-pull signal arises, for example, from diffraction by marked areas which have a different physical depth or a different reflected light phase from unmarked areas.

In the magneto-optic differential tracking scheme of U.S. Pat. No. 5,561,655, detector signals are combined differently. In this scheme, the signal from the photosensitive element on the left side of the detector is added to the signal from the photosensitive element on the right side of the detector. The result is compared with the sum of the remaining signals. In the example shown in FIG. 2, detector signals $A_1$ and $B_2$ would be summed, as would detector signals $B_1$ and $A_2$. The resulting sums would then be subtracted for a magneto-optic edge detection tracking measurement. This signal cross-coupling detects edges between magnetized domains, whose cross-track diffraction has the opposite sign for the two light polarizations. It effectively cancels out any "conventional" push-pull signal whose cross-track diffraction would have the same sign for the two light polarizations. This is useful for tracking on a magneto-optic medium whose "marks" are in the form of magnetized domains on an otherwise featureless surface. A "conventional" push-pull signal, as described above, would be incapable of tracking on such a medium. However the magneto-optic differential tracking scheme of U.S. Pat. No. 5,561,655 does not monitor in-track diffraction effects during the recording process.

SUMMARY OF THE INVENTION

Accordingly, it is an object of the present invention to provide a magneto-optic head for monitoring of mark formation during writing on a magneto-optic recording medium.

This object is achieved by a magneto-optic head for reading and writing information on a magneto-optic recording medium so that diffraction effects can be monitored during writing, comprising:

(a) a source of laser light for projecting a laser light beam during writing and reading;

(b) a first partial polarizing beamsplitter disposed in the beam of light for causing one beam of light to be transmitted to the recording medium and for receiving reflected light and for projecting such light in a first direction;

(c) a second polarizing beamsplitter for receiving polarized light in the first direction from the first partial polarizing beamsplitter and projecting such polarized light in second and third directions;

(d) a first detector for receiving light in the second direction from the second polarizing beamsplitter and a second detector for receiving light in the second direction from the second polarizing beamsplitter; and (e) each detector including at least two photosensitive elements being split in the in-track direction so that in-track diffraction effects can be determined.

ADVANTAGES

A feature of the present invention is that it provides for monitoring in-track diffraction effects during the recording process. These monitored effects are used to correct recording power during write and verify the quality of the recording process.

Another feature of the present invention is that by appropriately combining in-track detector signals, a magneto-optic head can measure either magneto-optic diffraction-based Direct Read During Write or non-polarization specific diffraction-based Direct Read During Write.

DETAILED DESCRIPTION OF THE PREFERRED EMBODIMENT

The present invention recognizes that prior art diffraction-based Direct Read During Write (DRDW) techniques, such as described, for example, in U.S. patent application Ser. No.

08/666,172, are insufficient for monitoring the data recording process with magneto-optic media. The present invention also recognizes that the differential detection tracking scheme of U.S. Pat. No. 5,561,655 can be adapted to the in-track direction to monitor the data recording process. The process to be monitored in magneto-optic recording is the heating of the recording medium above the Curie temperature by the recording beam. Above the Curie temperature the medium demagnetizes; this permits the recording medium to cool with a different magnetization after it drops back below the Curie temperature. The boundary between unheated (magnetized) media and heated (demagnetized) media beneath the recording beam produces both in-track and cross-track diffraction.

Figure 1:
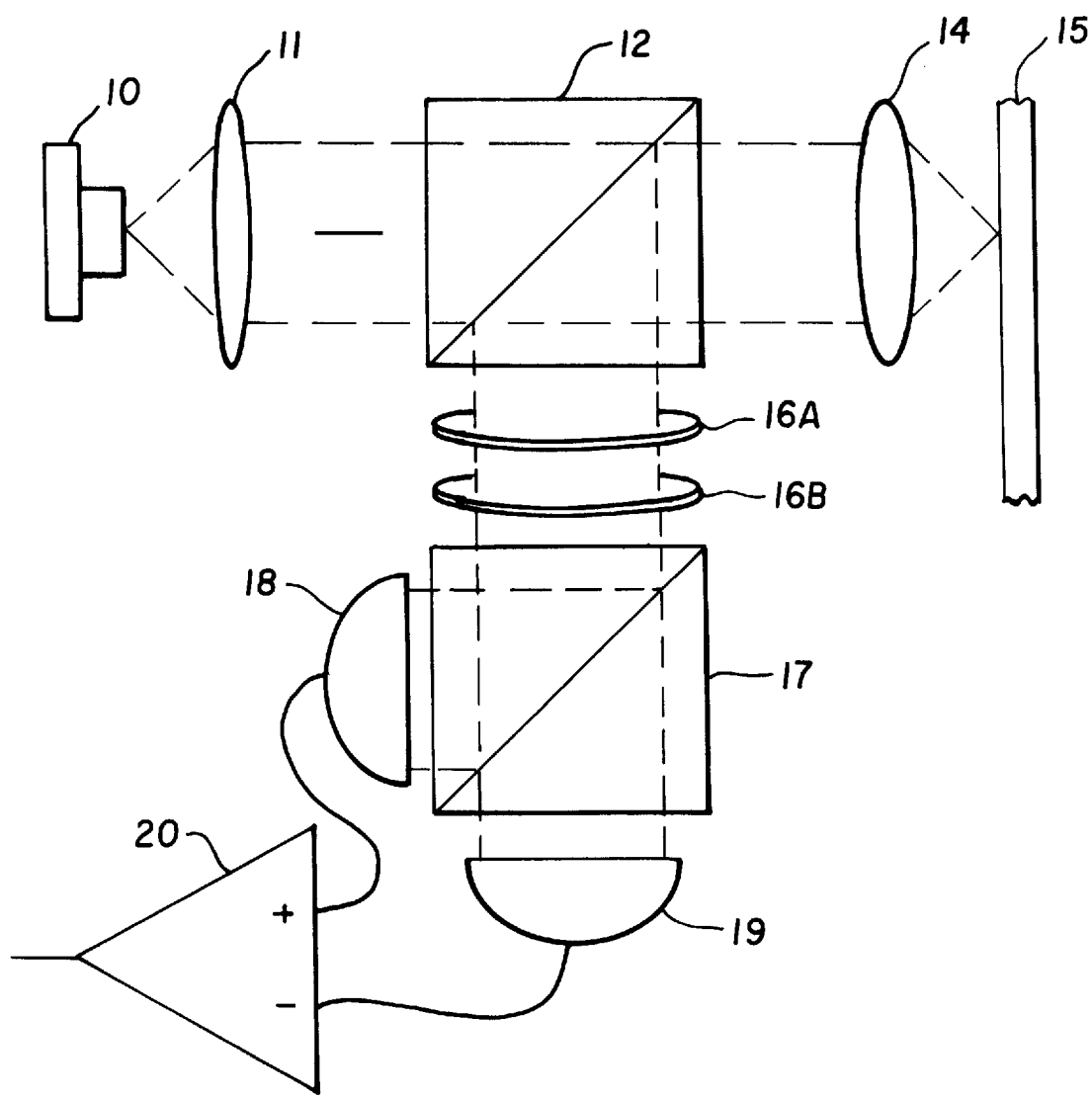
FIG. 1 is a block diagram of a prior art magneto-optic head.
Figure 2:
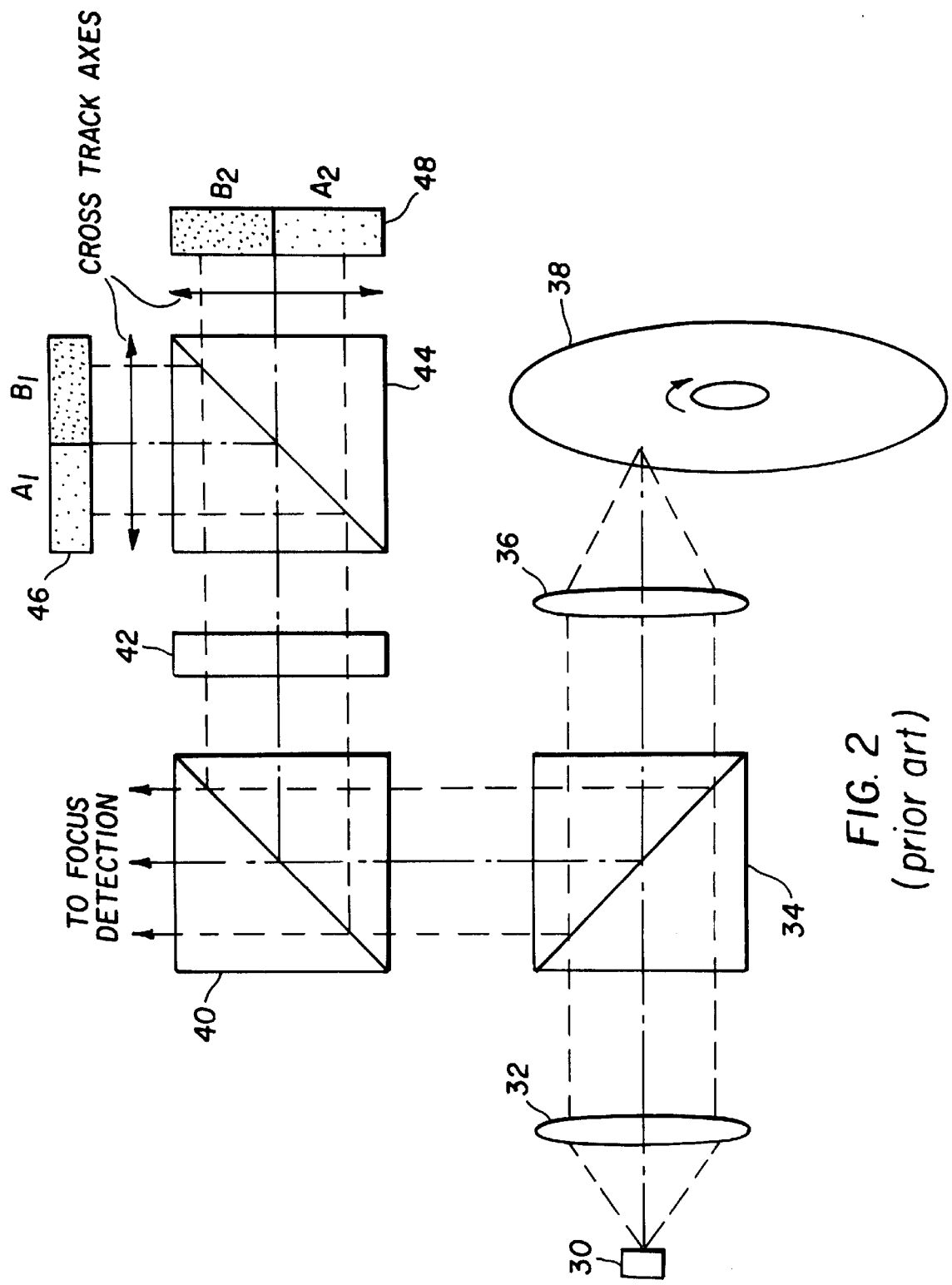
FIG. 2 is a schematic diagram of a prior art magneto-optic head for generating a cross-track signal on a magneto-optic recording medium.
Figure 3:
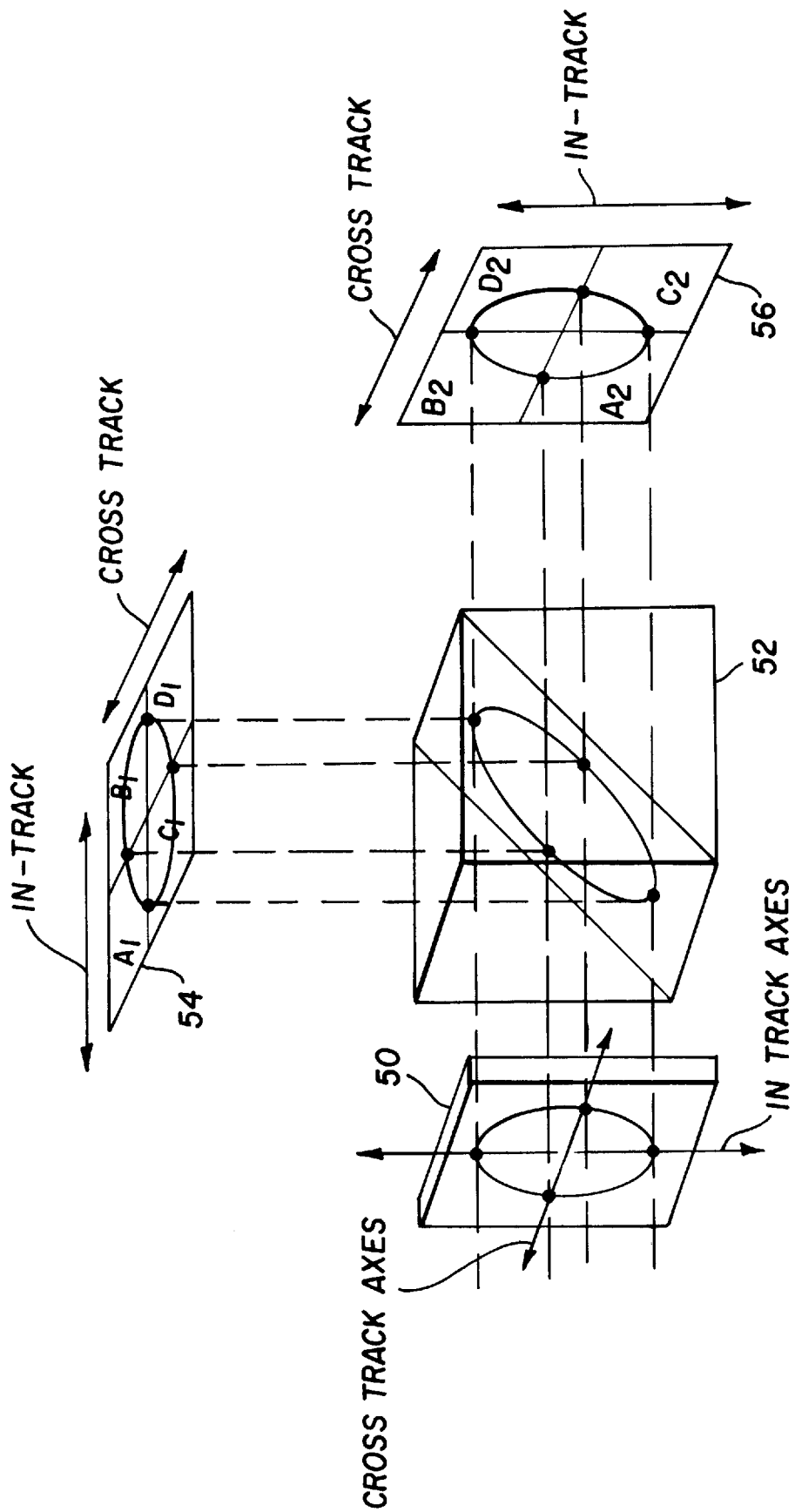
FIG. 3 is a schematic diagram of a portion of a magneto-optic head which can be used for diffraction-based Direct Read During Write measurements during magneto-optic data recording in accordance with the present invention.

This demagnetization process can be monitored by using a differential detection technique as shown in FIG. 3. FIG. 3 shows a portion of a magneto-optic head that can be used in accordance with the present invention. The other portions are shown in FIG. 1. FIG. 3 must be read in conjunction with FIG. 1. It will be understood that light coming into FIG. 3 has been directed by the partial polarizing beamsplitter 12 of FIG. 1. The return beam, as shown in FIG. 1 first engages a partial polarizing beamsplitter 12. A portion of the beam is directed to the lens 14 where it is focused onto the storage medium 15, which is shown as a magneto-optic disk. Light reflected from the disk 15 is directed back to the partial polarizing beamsplitter 12 where it is directed to a waveplate 50 shown in FIG. 3. The waveplate 50 is shown to have a cross-track axis and an in-track axis. The retardance and angular position of the waveplate 50 are predetermined so as to adjust the polarization state of the return beam to maximize the information in the beam from the partial polarizing beamsplitter 12. The angular position and retardance are selected as disclosed in commonly-assigned U.S. Pat. No. 5,282,188 and commonly-assigned U.S. Pat. No. 5,561,655, the disclosures of which are incorporated herein by reference. A polarizing beamsplitter 52 receives light from the waveplate 50 and deflects it into two separate optical paths according to its polarization. As shown schematically in FIG. 3, there are two detectors 54 and 56, each of which includes four photosensitive elements. As shown, detector 54 includes photosensitive elements $A_1$, $B_1$, $C_1$, and $D_1$. Similarly, detector 56 includes photosensitive elements $A_2$, $B_2$, $C_2$, and $D_2$. The light in the aperture can become imbalanced in both the in-track and cross-track directions due to diffraction effects. In accordance with the present invention, detectors 54 and 56 can be used to measure these effects. As shown in FIG. 3, each detector includes four photosensitive elements, but it will be understood that other numbers of photosensitive elements can be used to measure these effects.

Figure 4:
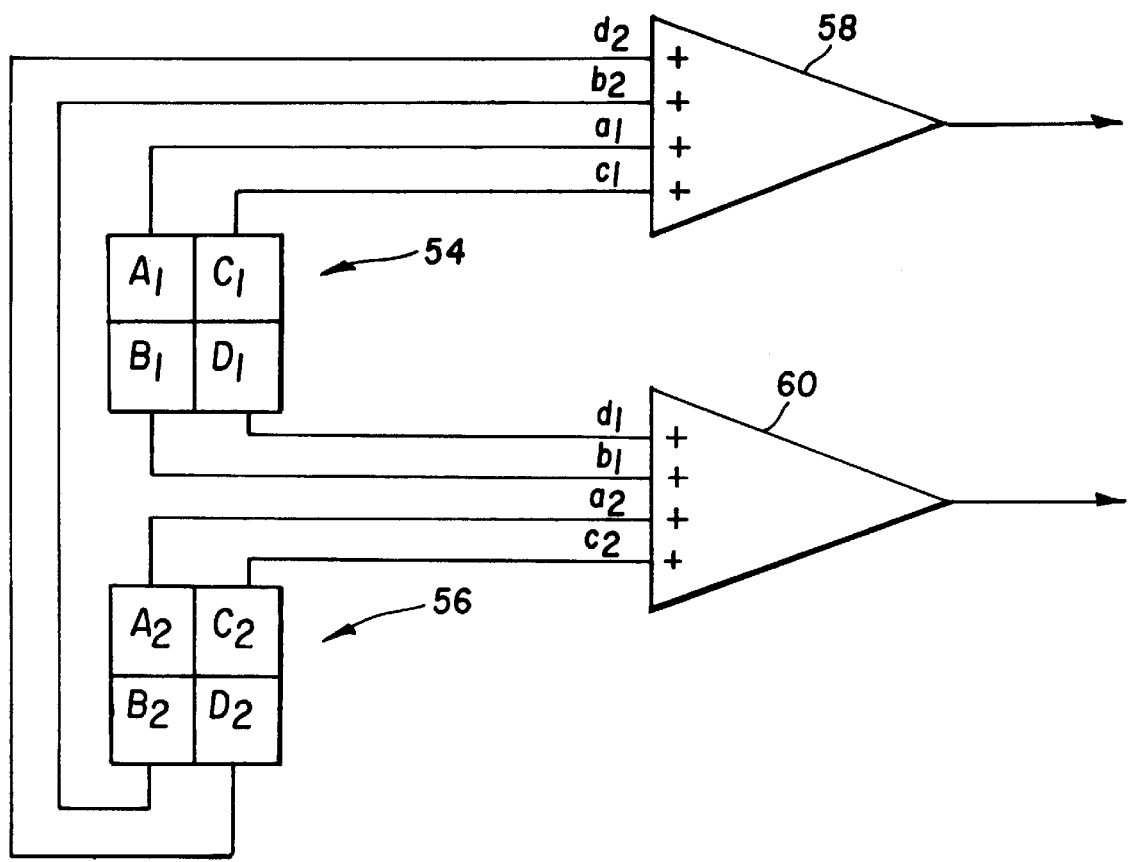
FIG. 4 is a schematic diagram illustrating the signals from the detectors in FIG. 3 configured for magneto-optic diffraction-based Direct Read During Write measurements in accordance with the present invention.

As previously discussed, diffraction by an edge on a magneto-optic disk between two different magnetizations (or, in this case, between a magnetized and a demagnetized zone) has the opposite sign for the two light polarizations. Therefore, the diffraction is detected by adding together signals from "opposite" aperture zones in the two optical paths instead of adding signals from "similar" aperture zones. For example, the front-of-the-aperture signals from one optical path can be added to the back-of the-aperture signals from the other optical path. The result would be compared with the sum of the remaining signals. Referring to FIG. 4, detector 54 has its photosensitive elements $A_1$ and $C_1$ provide inputs to a summing amplifier 58 and detector 56 has its photosensitive elements $B_2$ and $D_2$ provide inputs to the summing amplifier 58. In a similar manner, detector 54 has its photosensitive elements $B_1$ and $D_1$ provide inputs to a summing amplifier 60 and detector 56 has its photosensitive elements $A_2$ and $C_2$ provide inputs to the summing amplifier 60. As shown in FIG. 4, signals from photosensitive elements $A_1$, $B_1$, $C_2$, and $D_2$ are summed, as are signals from photosensitive elements $C_1$, $D_1$, $A_2$, and $B_2$. The resulting sums are then compared for a magneto-optic diffraction-based DRDW measurement, as will be described in conjunction with FIG. 6. This cancels out any non-polarization specific diffraction-based effects that might arise from this medium. Non-polarization specific diffraction-based effects can be used to generate a DRDW signal as would be appropriate for write-once media.

Figure 5:
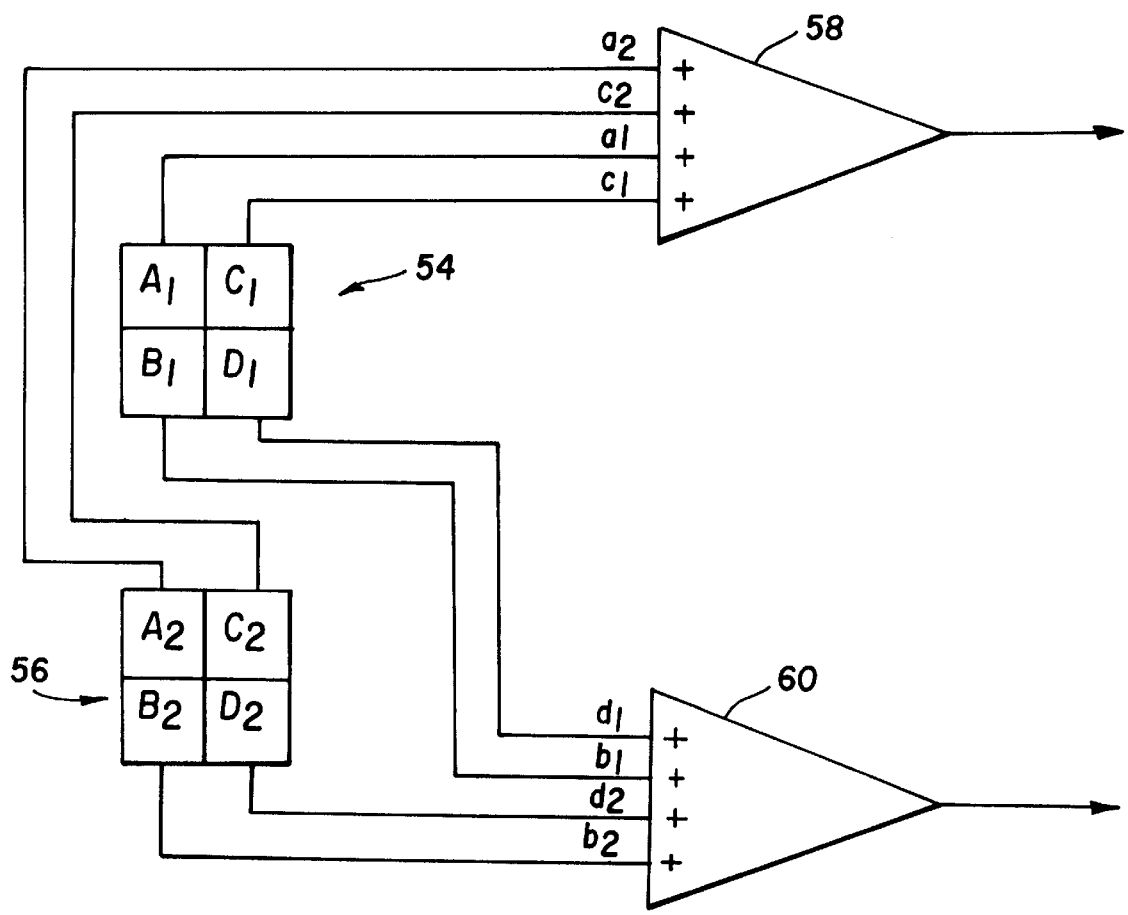
FIG. 5 is a schematic diagram illustrating the signals from the detectors in FIG. 3 configured for non-polarization specific diffraction-based Direct Read During Write measurements.

By comparison, non-polarization specific diffraction-based effects have the same sign for the two light polarizations. As shown in FIG. 5, the non-polarization specific diffraction-based DRDW effects are measured by adding together signals from "similar" aperture zones in the two optical paths. In FIG. 5, the same reference numerals for the elements are used with the exception that the summing amplifier 58 adds signals from the photosensitive elements $A_1$, $C_1$, $A_2$, and $C_2$ and the summing amplifier 60 adds signals from the photosensitive elements $B_1$, $D_1$, $B_2$, and $D_2$. The resulting sums would then be compared for a non-polarization specific diffraction-based DRDW measurement.

A non-polarization specific diffraction-based DRDW effect might occur if heated media had a different physical depth or a different reflected light phase from unheated media. However, it is not necessarily desirable to measure such an effect. For example, being a measurement only of media heating, it may not detect the actual demagnetization of the area beneath the recording beam as directly as the current invention does. On the other hand, signals from the detector configuration of FIG. 3 could be rearranged to detect non-polarization specific diffraction-based DRDW, if so desired. The result would then be insensitive to any magneto-optic diffraction based DRDW effect. The configuration of FIG. 3 also permits diffraction-based measurements to be made separately for each polarization state, that is, for each optical path. This additional information could be useful for monitoring the thermal recording process.

Figure 6:
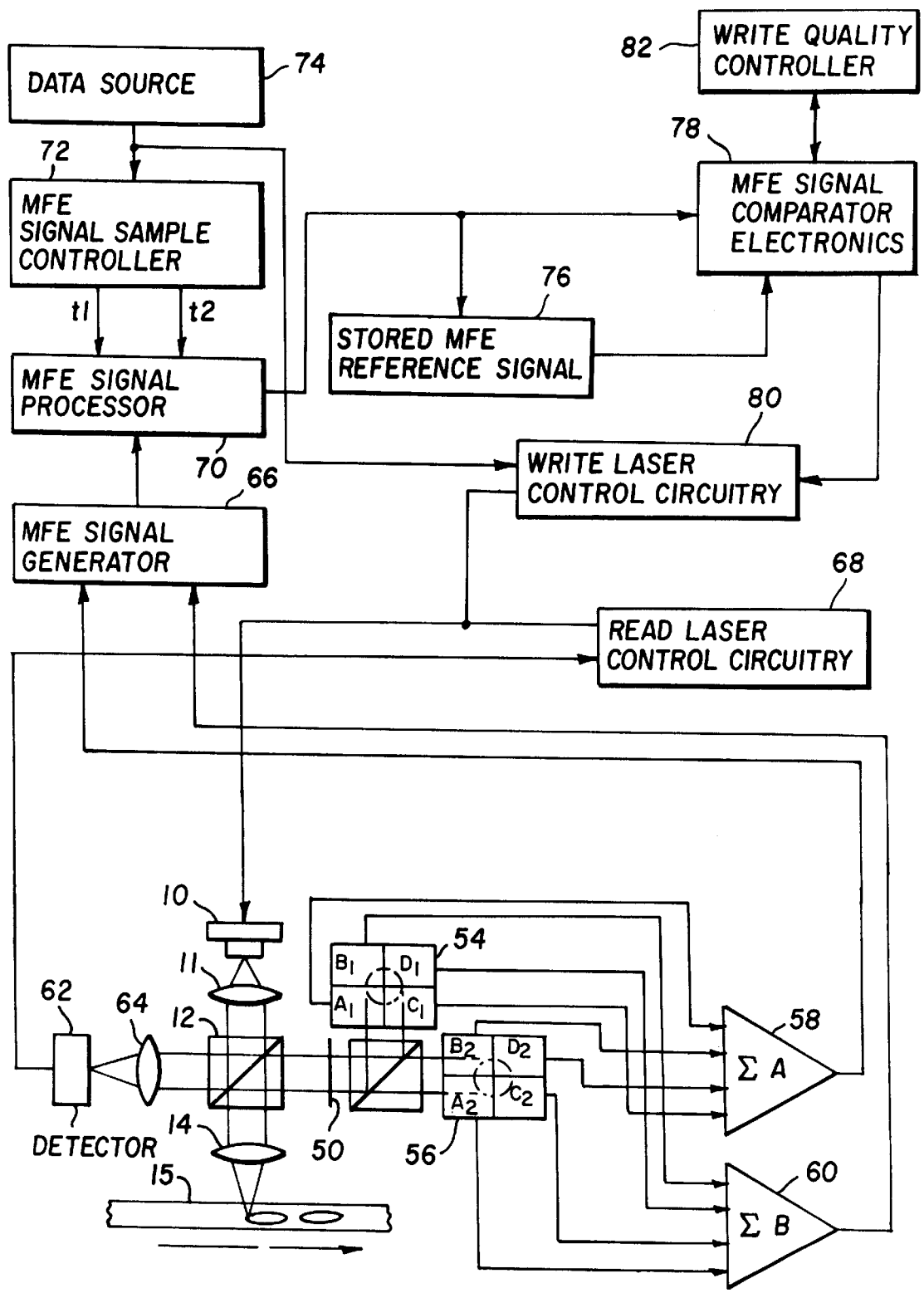
FIG. 6 is a schematic diagram partially in block form of a magneto-optic recording apparatus including a magneto-optic head in accordance with the present invention for monitoring and controlling the magneto-optic data recording process.

Referring now to FIG. 6, a magneto-optic recording apparatus is shown in accordance with the present invention for monitoring and controlling the magneto-optic data recording process by adjusting laser power. Where elements correspond to those previously described, the same reference numerals will be used. It should be noted that a front-facet detector 62 receives light by way of a focusing lens 64 from the partial polarizing beamsplitter 12. The front facet detector 62 is used to control the read power of the laser using read laser control circuitry shown as a block 68. The configuration of the detectors 54 and 56 in FIG. 6 are the same as shown in FIG. 3. The detector signals are combined as shown in FIG. 4 by summing amplifiers 58 and 60. The output signals from the summing amplifiers 58 and 60 are applied to a mark formation effectiveness (MFE) signal generator 66. The MFE signal generator 66 generates an MFE signal which is indicative of the quality of the signal formed during mark formation.

As shown in FIG. 6, the MFE signal is defined by the following relationship:

$$MFE=(A_1+C_1+B_2+D_2)-(A_2+C_2+B_1+D_1).$$

wherein MFE is the magneto-optic MFE signal, $A_1$, $B_1$, $C_1$, and $D_1$ are signals generated by the photosensitive elements of detector 54, and $A_2$, $B_2$, $C_2$, and $D_2$ are signals generated by the photosensitive elements of detector 56.

Alternatively, the MFE signal can be defined by the following relationship:

$$MFE=(A_1+C_1+A_2+C_2)-(B_1+D_{1+B2}+D_2).$$

Referring again to FIG. 6, the MFE signal from the MFE signal generator 66 is applied to an MFE signal processor 70 which samples the MFE signal according to times $t_1$ and $t_2$ as dictated by an MFE signal sample controller 72. The MFE signal sample controller 72 receives the data stream from a data source 74 to produce sample timing which is synchronous with the writing process. The diffraction-based MFE signal is sampled at predetermined times during a write pulse. An MFE reference signal is stored in block 76. The MFE reference signal was predetermined during a calibration process as the MFE signal that corresponded to the best recording quality. The sampled MFE signal from the MFE signal processor 70 is compared to the MFE reference signal from block 76 in an MFE signal comparator 78. The difference between the sampled MFE signal and the MFE reference signal forms a basis for controlling the power of write pulses using write laser control circuitry 80 and to measure recording quality with a write quality controller 82. Recording quality is measured by the deviation of the sampled MFE signal from the MFE reference signal.

The invention has been described in detail with particular reference to a preferred embodiment thereof. However, it will be appreciated that variations and modifications can be effected by a person of ordinary skill in the art without departing from the spirit and scope of the invention.

PARTS LIST

| | |
|---|---|
| 10 | light source |
| 11 | lens |
| 12 | partial polarizing beamsplitter |
| 14 | objective lens |
| 15 | storage medium |
| 16A | quarter waveplate |
| 16B | half waveplate |
| 17 | polarizing beamsplitter |
| 18 | detector |
| 19 | detector |
| 20 | differential amplifier |
| 30 | laser light source |
| 32 | lens |
| 34 | partial polarizing beamsplitter |
| 36 | objective lens |
| 38 | disk |
| 40 | partial polarizing beamsplitter |
| 42 | waveplate |
| 44 | polarizing beamsplitter |
| 46 | detector |
| 48 | detector |
| 50 | waveplate |
| 52 | polarizing beamsplitter |
| 54 | detector |
| 56 | detector |
| 58 | summing amplifier |
| 60 | summing amplifier |
| 62 | front facet detector |
| 64 | focusing lens |
| 66 | mark formation effectiveness signal generator |
| 68 | read laser control circuitry |
| 70 | mark formation effectiveness signal processor |
| 72 | mark formation effectiveness signal sample controller |
| 74 | data source |
| 76 | mark formation effectiveness reference signal |
| 78 | mark formation effectiveness signal comparator |
| 80 | write laser control circuitry |
| 82 | write quality controller |

What is claimed is:

1. A magneto-optic recording apparatus for reading and writing information on a magneto-optic recording medium so that diffraction effects are monitored during writing, comprising:

(a) a source of laser light for projecting a laser light beam during writing and reading;

(b) a first partial polarizing beamsplitter disposed in the beam of light for causing one beam of light to be transmitted to the recording medium and for receiving reflected light and for projecting such reflected light in a first direction;

(c) a second polarizing beamsplitter for receiving polarized light in the first direction from the first partial polarizing beamsplitter and projecting such polarized light in second and third directions;

(d) a first detector for receiving light in the second direction from the second polarizing beamsplitter and a second detector for receiving light in the third direction from the second polarizing beamsplitter;

(e) each detector including at least two photosensitive elements being split in the in-track direction for producing separate signals so that in-track diffraction effects are determined;

(f) means responsive to the signals produced by the first and second detectors for producing a mark formation effectiveness signal;

(g) means for storing a predetermined mark formation effectiveness reference signal which is representative of a desired mark formation effectiveness signal; and (h) means responsive to the mark formation effectiveness signal and the mark formation effectiveness reference signal for adjusting the amount of power that the laser produces to maintain optimum mark quality.

2. The magneto-optic recording apparatus of claim 1 wherein each detector includes at least four photosensitive elements, two of such photosensitive elements being split in the in-track direction and two being split in the cross-track direction so as to be able to monitor diffraction effects in both cross-track and in-track directions.

3. The magneto-optic recording apparatus of claim 2 further including a waveplate disposed in the path of the first directed light beam before the second polarizing beamsplitter.

4. The magneto-optic recording apparatus of claim 3 further including a third partial polarizing beamsplitter disposed in the path of the first directed light beam for splitting the light beam and projecting a first portion to the waveplate and a second portion for focus signal detection.

5. The magneto-optic recording apparatus of claim 1 further including means responsive to the mark formation effectiveness signal and the mark formation effectiveness reference signal for verifying recorded mark quality.

6. The magneto-optic recording apparatus of claim 5 wherein the first and second detectors each include four photosensitive elements, two of such photosensitive elements being split in the in-track direction and two being split in the cross-track direction so as be able to monitor diffraction effects in both cross-track and in-track directions, and the mark formation effectiveness signal is a magneto-optic mark formation effectiveness signal determined by the following relationship:

$$MFE=(A_1+C_1+B_2+D_2)-(A_2+C_2+B_1+D_1)$$

wherein MFE is the magneto-optic mark formation effectiveness signal, $A_1$, $B_1$, $C_1$, and $D_1$ are signals from the four photosensitive elements, respectively, from the first detector, and $A_2$, $B_2$, $C_2$, and $D_2$ are signals from the four photosensitive elements, respectively, from the second detector.

7. The magneto-optic recording apparatus of claim 6 wherein the mark formation effectiveness signal is a sampled data signal.

8. The magneto-optic recording apparatus of claim 5 wherein the first and second detectors each include four photosensitive elements, two of such photosensitive elements being split in the in-track direction and two being split in the cross-track direction so as be able to monitor diffraction effects in both cross-track and in-track directions, and the mark formation effectiveness signal is a write-once mark formation effectiveness signal determined by the following relationship:

$MFE = (A_1 + C_1 + A_2 + C_2) - (B_1 + D_1 + B_2 + D_2)$ wherein MFE is the write-once mark formation effectiveness signal, $A_1$, $B_1$, $C_1$, and $D_1$ are signals from the four photosensitive elements, respectively, from the first detector, and $A_2$, $B_2$, $C_2$, and $D_2$ are signals from the four photosensitive elements, respectively, from the second detector.

9. The magneto-optic recording apparatus of claim 8 wherein the mark formation effectiveness signal is a sampled data signal.

* * * * *